(12) United States Patent
Sosonkin et al.

(10) Patent No.: US 10,740,565 B1
(45) Date of Patent: Aug. 11, 2020

(54) DEVIATION-BASED FRAMEWORK

(71) Applicant: Amazon Technologies, Inc., Seattle, WA (US)

(72) Inventors: Mikhail Sosonkin, Bainbridge Island, WA (US); Michael Egan Butler, Herndon, VA (US); Ken F Eggers, Woodbridge, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/050,488

(22) Filed: Jul. 31, 2018

(51) Int. Cl.
| | |
|---|---|
| *G06F 40/30* | (2020.01) |
| *G06Q 10/06* | (2012.01) |
| *H04L 9/32* | (2006.01) |
| *G06N 20/00* | (2019.01) |
| *G06F 16/2457* | (2019.01) |

(52) U.S. Cl.
CPC ........ *G06F 40/30* (2020.01); *G06F 16/24578* (2019.01); *G06N 20/00* (2019.01); *G06Q 10/063* (2013.01); *H04L 9/3239* (2013.01)

(58) Field of Classification Search
CPC .................................................. G10L 17/2785
USPC ............................................................ 704/9
See application file for complete search history.

(56) References Cited

U.S. PATENT DOCUMENTS

| | | | | |
|---|---|---|---|---|
| 9,390,268 | B1* | 7/2016 | Martini | G06F 21/566 |
| 9,558,322 | B2* | 1/2017 | Carey | G06F 21/62 |
| 2007/0300286 | A1* | 12/2007 | Judge | G06F 21/554 |
| | | | | 726/1 |
| 2011/0161069 | A1* | 6/2011 | Staffel | G06Q 10/00 |
| | | | | 704/9 |
| 2012/0278065 | A1* | 11/2012 | Cai | G06Q 30/0278 |
| | | | | 704/9 |
| 2013/0124192 | A1* | 5/2013 | Lindmark | G06F 17/274 |
| | | | | 704/9 |
| 2016/0241579 | A1* | 8/2016 | Roosenraad | G06F 16/9535 |
| 2017/0286544 | A1* | 10/2017 | Hunt | H04L 63/1416 |
| 2018/0096260 | A1* | 4/2018 | Zimmer | G06N 5/04 |
| 2018/0332066 | A1* | 11/2018 | Moynahan | H04L 9/3236 |
| 2018/0349583 | A1* | 12/2018 | Turgeman | G06Q 20/40145 |
| 2019/0171845 | A1* | 6/2019 | Dotan-Cohen | H04L 63/105 |

* cited by examiner

*Primary Examiner* — Jakieda R Jackson
(74) *Attorney, Agent, or Firm* — Lee & Hayes, P.C.

(57) ABSTRACT

This disclosure describes techniques implemented partly by a cloud-based service provider for providing a sentiment-analysis service to determine whether sentiments, or attitudes, of users have significantly decreased. The sentiment-analysis service is composed of various services provided by the cloud-based service in order to determine significant negative deviations in sentiment of users towards an entity. Further, the sentiment-analysis service utilizes various techniques, such as encryption, to privatize the process such that private user information is protected. In some examples, an entity may not know the content of communications or the reasons the user's sentiment has dropped, but may be alerted of a general negative change in sentiment towards the entity by the user.

20 Claims, 10 Drawing Sheets

DEVIATION-BASED FRAMEWORK

BACKGROUND

In today's society, many communication avenues exist by which people can easily publish information that is readily accessible to other users. For example, the Internet provides people with access to various online communities, news-aggregation sources, social media websites, and/or other open-communication sources. While these communication avenues are valuable in that they encourage free thought and the dissemination of ideas, the ease by which information can be irrevocably published via these communication avenues for anyone to access can allow malicious users to publish sensitive or confidential information that can negatively affect other users or organizations.

Often, organizations hire employees who are provided with access to sensitive information, such as the development of a new product for the organization that has not come to market. To mitigate this, employers often have their employees enter into agreements where the employee agrees not to disclose confidential information outside the organization. However, disgruntled employees with access to confidential information still pose an insider threat to the organization, such as by potentially leaking information about development of the new product prior to being released to the public. Rather than being reactive to information leaks by quickly removing leaked information from an online location, employers desire to identify employees who pose insider threats before a malicious act is taken by the employees. However, it is difficult to determine if an employee is unhappy while still maintaining the privacy for the employee. Additionally, when an organization employs a large workforce, it is impracticable to have access to the amount of resources needed to determine if one of their employees pose an insider threat. Further, employers often experience biases towards certain employees, such as having more favorable opinions of high-performing employees, and less favorable opinions of low-performing employees. However, these biases commonly experienced by employers may prevent those employers from identifying employees that may pose a threat, such as by assuming a high-performing employee is not a threat to leave the organization or be disgruntled at the organization. Accordingly, employers are unable to identify employees who pose an insider threat, or another type of threat, to an organization.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
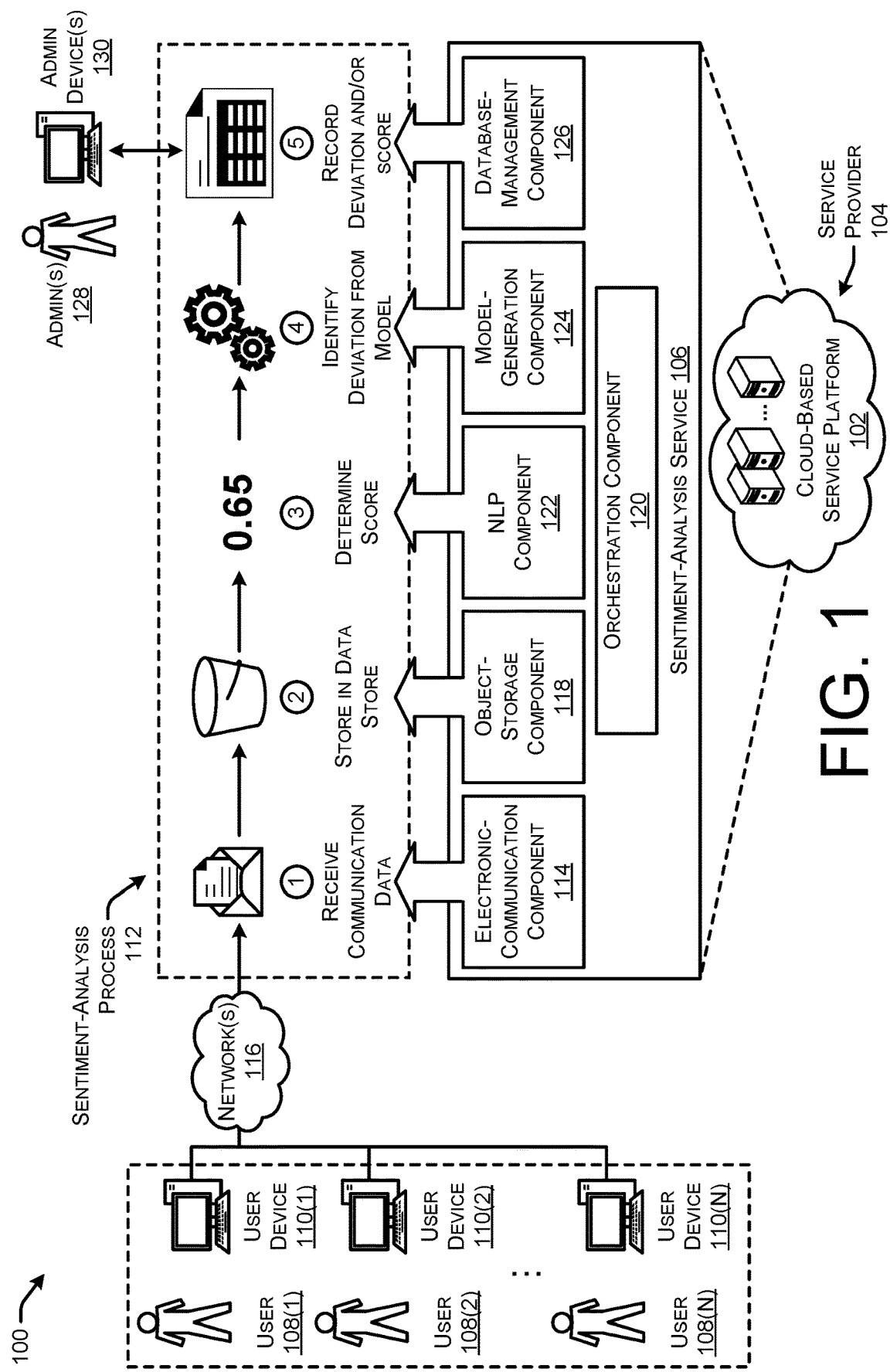
FIG. 1 illustrates a system-architecture diagram of an example environment in which a service provider provides a sentiment-analysis service to identify users as having a negative sentiment towards an employer or organization.

This disclosure describes, at least in part, techniques and topologies for performing sentiment analysis to identify employees as having potentially malicious intentions or motives before the employees are able to perform malicious acts. The techniques described herein include identifying employees with potentially malicious intentions by identifying significant negative deviations in their sentiment towards an employer or organization, while still maintaining the privacy of the employees. Additionally, the topologies described herein at least partially include using various cloud-based services provided by a cloud-based services provider that are supported by large amounts of resources such that the data processing required for the sentiment-analysis techniques are scalable for any number of employees. In this way, employers that employ relatively large number of employees may attempt to prevent their employees from performing malicious and/or negative acts towards the organization (e.g., insider threats, departing the organization, violence in the workplace, etc.), while still maintaining the privacy of their employees.

In some examples, the sentiment analysis techniques described herein may be provided as a service to customers, or users, of a service provider. Service providers may offer cloud-based services to fulfill users' computing-service needs without the users having to invest in and maintain computing infrastructure required to implement the services. These service providers may provide cloud-based computing resources and functionality to implement other types of services, such as scalable-storage services, natural-language processing (NLP) services, server-less code-execution services, machine-learning model services, database-management services, and so forth.

Although users may subscribe for use of more simple, individual services provided by the service providers, such as scalable-storage services to store data, in some examples, the service providers may utilize various combinations of existing cloud-based services in order to provide and implement a scalable, sentiment-analysis service for users.

The service provider may analyze communications performed by employees in order to determine a sentiment (e.g., view, attitude, opinion, etc.) of the employees toward their employer. The service provider may receive communication data representing communications using a cloud-based communication service. For example, the service provider may provide an email service, an instant-messaging service, a video-conferencing service with chat capabilities, etc., for use by the employees. As the employees send and receive communications using the cloud-based communication service(s) provided by the service provider, the service provider may store communication data representing the communications in order to determine a sentiment of the employees toward the employer that is represented in the communications.

In some examples, the service provider may receive, or otherwise obtain, the communication data of the employees and store the data in a managed storage location provided and/or managed by a cloud-based storage service. For example, the cloud-based storage service may provide scalable storage (e.g., data stores, repositories, object storage, etc.) as a service to users. In some examples, one or more data stores that are managed by the cloud-based storage service may be utilized to store the communication data. To implement the cloud-based sentiment analysis service, the cloud-based communication service(s) may be configured to store the communication data in the data store(s) that are allocated for use by the cloud-based sentiment-analysis service. In this way, as the employees send and receive communications, the corresponding communication data may be securely stored in the data store(s) provided by the cloud-based storage service, which may be encrypted data store(s) to prevent unauthorized access.

The cloud-based sentiment-analysis service may be implemented or managed at least partly by software code that is executed by a cloud-based code-execution service that is provided by the service provider. The cloud-based code-execution service, also referred to herein as an "orchestration component," may orchestrate or coordinate at least some of the processes or techniques performed by the sentiment-analysis service. Generally, the orchestration component may execute code required to implement the sentiment-analysis service without provisioning or managing servers of the service provider. In this way, the orchestration component may facilitate operations of the sentiment-analysis service by scaling and executing the appropriate code based on various triggers or conditions.

In some examples, the orchestration component may be triggered to run code upon detecting new communication data being placed in a data store of the sentiment-analysis service. Upon detecting new communication data, the orchestration component may provide the new communication to a cloud-based natural-language processing (NLP) service that is provided by the service provider. The NLP service may use machine learning to find various insights and relationships in the text of the communication data representing the communications of the employees. For example, the NLP service may analyze text of the communication data to identify language of the text, extract key words, phrases, people, events, places, etc., and understand how positive or negative the text is. The text may be identified as including various negative aspects of an employee towards an employer, such as violence in the workplace, negative feelings towards the organization, desire to leave the organization, intent to leak confidential information, and so forth. The NLP service may determine, for each communication of the employees, a sentiment value (also referred to herein as "sentiment score(s)") that indicates an attitude of the employee toward their employer or organization.

Upon computing or determining sentiment values for the communications of the employees, the orchestration component may provide the sentiment values, and in some examples, also provide the corresponding communication data, to a cloud-based machine-learning (ML) model service offered by the service provider. The cloud-based ML model service may be configured to build, train, and deploy ML models at any scale utilizing input training data. The cloud-based ML model service may provide different types of ML models that can be built and trained for the employers (e.g., linear regression models, artificial neural network (ANN) models, random cut forest models, etc.) to model or otherwise establish a sentiment baseline for each employee of the employer. For instance, the cloud-based ML model service may build and train an ML model for each employee using the sentiment values determined for the communications of the employees. The ML models may indicate a sentiment baseline, or a "normal" sentiment or attitude, for each employee towards the employer or organization.

Once the ML models are established for each employee, sentiment values for subsequent communications of the employees are then compared to the established sentiment baseline to identify significant negative deviations from the baseline. For instance, the orchestration component may detect that new communication data is placed in a data store of the sentiment-analysis service, and provide the communication data to the cloud-based NLP service to determine a sentiment value for the new communication data. The orchestration component may then provide the sentiment value for the new communication data to the cloud-based ML model service in order to determine whether the sentiment value deviates from the established baseline for that user. If the cloud-based ML model service determines that the sentiment value for the new communication data deviates from the established baseline by more than a threshold deviation value, then the orchestration component may determine that the employee is unhappy, or otherwise has a negative sentiment toward the employer or organization.

The orchestration component may perform various operations if one or more communications of an employee violate a threshold deviation, or amount to a significant negative deviation. For instance, the orchestration component may flag the employee to a human resources (HR) agent of the organization indicating that the employee's sentiment toward the organization has become significantly more negative.

As noted above, the techniques described herein preserve the privacy of employees in various ways. In some examples, the communication data may be initially placed in an encrypted data store in order to prevent unauthorized entities from accessing the communication data. Further, after the sentiment values are determined for the communications, the orchestration component may delete the communications from the encrypted data store. In this way, only sentiment values may be determined for communications of an employee, but the employer and service provider may not have any knowledge of the contents of the communication data. Even further, the sentiment values may simply indicate a numeric value (e.g., a value between "0" and "1") that does not provide any indication as to why the employee may have a negative sentiment toward the organization.

Additionally, although the sentiment values for communications may be mapped to identifiers for the employees, the identifiers may not indicate who the employee is, or otherwise be readily used to indicate who the employee is. For example, the orchestration component may identify an identity of the user from the communication data (e.g., a name, email address, etc.). However, rather than utilizing the identity of the user, the orchestration component may encrypt the identity of the user, such as by executing a hashing function such as MD5 to generate a unique, hashed ID of the employee. In this way, the sentiment values may be mapped to a hashed ID of the employee which has been hashed, such as by using a one-way cryptographic function. In a separate, encrypted data store, the actual ID of each employee may be mapped to the hashed ID for each employee.

However, not only is the data store that includes the mappings between employee IDs and hashed IDs encrypted, thereby restricting what entities are allowed to access it (e.g., certain HR employees), but the data store may further be monitored by a cloud-based access-monitoring service which identifies what entities access the data store, and record the access event. For instance, if an authorized entity (e.g., HR employee, administrator, etc.) uses credentials of an authorized user account to access the data store that stores the mappings between employee IDs and hashed IDs, the cloud-based access-monitoring service may record an indication of the user account, an indication of the time the data store was accessed, and/or other information. Thus, if an authorized entity is accessing the data store when there is no reason to access the data store, or if they are frequently accessing the data store, an administrator of the organization may be notified. In even further examples, an authorized entity may only be permitted to access the data store if a sentiment value for a communication violates a significant negative deviation threshold. In this way, the privacy of employees may be maintained as (i) the underlying communication data is deleted and not accessed by human entities, (ii) the sentiment scores may only indicate that the employee has recently had a change in negative sentiment toward the company without any further information, (iii) only authorized entities are able to determine the real identities of the employees, and (iv) authorized entities are also tracked to ensure that the authorization is not being abused. However, the techniques described herein do allow for organizations and employers to intervene and speak with an employee to discuss why their sentiment has changed towards the organization, thereby preventing potentially malicious acts from occurring. In some instances, the service provider may additionally receive authorization from users before accessing their communication data. For instance, the users themselves may opt in, sign an employee agreement with The techniques described herein affect computing devices in various ways and improve upon other sentiment-analysis techniques in various ways. For instance, prior sentiment-analysis techniques required human intervention where humans would look at communication data, and also identities of the users being evaluated, thereby not providing privacy to the users. Further, prior sentiment-analysis techniques involve a very resource-intensive process, making the prior techniques not scalable to large groups of users and large amounts of data. However, by utilizing services provided by a cloud-based service provider, sentiment-analysis techniques are improved upon because the amount of resources provided, and the availability and scalability of the services, allows for processing or large amounts of data to determine sentiment in communications for a large number of users.

Additionally, the techniques described herein may remove different types of biases commonly experienced by humans, such as employers. For example, the techniques may remove confirmation bias experienced by employers when determining whether employees have a negative sentiment towards the employer. It is often the case that employers will have a positive opinion of high-performing employees, and not as positive of an opinion of low-performing employees. However, the techniques described herein are purely data-dependent and do not consider identities of the employees. Thus, the sentiment-analysis service will surface employees whose communications have indicated that they have a negative sentiment towards an organization regardless of whether the employer likes, or does not like, that employee. In this way, the techniques mitigate confirmation bias or otherwise remove human bias when analyzing data and determining sentiment to confirm/ignore negative bias of the employer depending on the employee at issue. Examples of other biases that may be experienced by employers may include diclinism (e.g., remembering an employee more favorably based on past events rather than current events), in-group bias (e.g., unfairly favoring employees that the employer gets along with or is friends with), halo effect (e.g., an employer may particularly like an employee and favor them due to their agreeable personality or appearance), belief bias (e.g., if a conclusion of an employer towards an employee supports the employer's existing beliefs, they will rationalize anything to support that conclusion), and so forth. Thus, prior sentiment-analysis techniques may suffer from subjective biases of employers or other humans. However, by performing the data-centric and anonymized sentiment-analysis techniques described herein, employees with negative sentiments towards an employer may be more objectively and accurately identified than prior techniques.

Although the techniques described herein are done so with respect to sentiment of employees with respect to an organization, the techniques are equally applicable for other types of users and/or entities. For example, the techniques could be applied by governments and to groups of monitored users to identify potential national security concerns, such as terrorist activities. However, techniques described herein are not applied to any users without various permissions and also upon request. For instance, an employer and/or organization must explicitly request use of this service. Further, as noted above, the techniques described herein do not reveal the actual communications being had by employees or other users, but simply indicate if a sentiment of an employee or user has become negative, or significantly negative.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment in which a service provider provides a sentiment-analysis service to identify users as having a negative sentiment towards an employer or organization.

As illustrated in the example environment 100, the cloud-based service platform 102 may comprise cloud-based devices and may be operated and managed by a service provider 104. The service provider 104 may offer various cloud-based services to users to fulfill computing needs of the users. These service providers 104 may operate clusters of managed servers stored in data centers located across various geographic areas. In this way, users of the cloud-based services do not need to invest in and maintain the computing infrastructure required to implement the various services that they may need. Additionally, users are able to access, or provide to their clients, these cloud-based services over large geographic areas. To offer these cloud-based services across different geographic areas, service providers 104 operate and maintain cloud-based platforms (e.g., cloud-based computing environments, network-based service architectures, network-based service infrastructures, etc.).

The cloud-based service platform 102 may interact with, and in some examples, include one or more computing resources that are each included in one or more data centers. The data centers may be located across disparate geographical regions such that computing resource(s) are available to support functionality for cloud-based services provided via the cloud-based service platform 102. The data centers may be provisioned in a cloud-based computing platform associated with the cloud-based service provider 104. Additionally, or alternatively, the data centers may be on-premise data centers at least partly maintained and/or managed by a client. Even further, the data centers may additionally, or alternatively, be provisioned in cloud-based computing platforms associated with separate cloud-based service providers. The computing resources may include various combinations of hardware-based components, such as central processing units, memory, storage, network capacity, and/or any other type of hardware-based resource to support cloud-based services. In some examples, the computing resources may further include respective memories that store various firmware-based and/or software-based resources that provide the functionality of the services, such as one or more applications.

In some examples, the cloud-based service platform 102 may be configured to provide a sentiment-analysis service 106 to identify users 108 as having a negative sentiment towards an employer or organization. For instance, users 108(1), 108(2), to 108(N), where N is any integer greater than 2 (collectively referred to herein as "users 108" or simply "user 108) may operate respective user devices 110(1), 110(2), to 10(N) (collectively referred to herein as "user devices 110" or simply "user device 110) may be employees who are employed by an organization or employer. In some examples, the organization or employer may by the service provider 104 itself. The users 108 may communicate with each other, and/or with other users that are not employees, various types of electronic communication data (e.g., emails, text messages, instant messages, video chat data, etc.). In some examples, the communication data may include text data that represents attitudes, or sentiments, of the users 108 towards their employer or the organization with which they are affiliated. For instance, the users 108 may email each other and discuss changes made in the company, the way their superiors treat them, offers from other companies or organizations, and/or any other type of text data that may represent a sentiment of the user 108 toward their employer. In some instances, the communication data may comprise video data, which may be converted into text data using transcription for further analysis.

As illustrated, the sentiment-analysis service 106 may perform a sentiment-analysis process 112 in order to determine a sentiment of the user(s) 108 with respect to their employer, and/or identify significant negative deviations in the sentiment of a user 108. To implement the sentiment-analysis process 112, the sentiment-analysis service 106 may utilize one or more existing components (the term "component" is also referred to herein as a "service") in conjunction. For example, the sentiment-analysis service 106 may be at least partly composed of, or at least partly utilize, existing cloud-based services/components provided by the cloud-based service provider 104 which are supported by large amounts of resources such that the data processing required for the sentiment-analysis process 112 are scalable for any number of users 108.

At "1" of the sentiment-analysis process 112, an electronic-communication component 114 may receive, over one or more networks 116, communication data. In some examples, the electronic-communication component may provide one or more electronic communication avenues for the user devices 110 to communicate with other devices, such as an email service, a messaging service, a blogging service, a video-chat service, and/or any other type of service. The network(s) 116 (e.g., WANs, PANs, LANs, etc.) may comprise any type of network or combination of network, including wired and/or wireless networks. In various examples, the communication data may be communicated at least partly by a third-party communication service, and then provided to the sentiment-analysis service 106.

At "2" of the sentiment-analysis process 112, the electronic-communication component 114 may store the communication data in one or more data stores that are managed by an object-storage component 118. The object-storage component 118 may comprise a data-storage service that manages a computer data storage architecture that manages data as objects, and may be automatically scalable for large amounts of data. The communication data may be stored in one or more data stores, or one or more repositories, or any other data-storage means and/or location.

The sentiment-analysis service 106 may include an orchestration component 120 that may orchestrate or coordinate at least some of the sentiment-analysis process 112 performed by the sentiment-analysis service 106. Generally, the orchestration component 120 may allow execute code required to implement the sentiment-analysis service 106 without provisioning or managing servers of the service provider 104. In this way, the orchestration component 120 may facilitate operations of the sentiment-analysis service by scaling and executing the appropriate code based on various triggers or conditions.

Further, after "2" of the sentiment-analysis process 112, the orchestration component 120 may be triggered to run code upon detecting new communication data being placed in a data store of the object-storage component 118. Upon detecting new communication data, the orchestration component 120 may provide the new communication to a cloud-based natural-language processing (NLP) component 122 that is provided by the service provider 104. The NLP component 122 may use machine learning to find various insights and relationships in the text of the communication data representing the communications of the users 108. For example, the NLP service may analyze text of the communication data to identify language of the text, extract key words, phrases, people, events, places, etc., and understand how positive or negative the text is. The text may be identified as including various negative aspects of an employee towards an employer, such as violence in the workplace, negative feelings towards the organization, desire to leave the organization, intent to leak confidential information, and so forth.

At "3" of the sentiment-analysis process 112, the NLP component 122 may determine, for one or more communications of the users 108, a sentiment score that indicates an attitude of the user(s) 108 toward their employer or organization.

Once the NLP component 122 has determined the sentiment score for the communication data, the orchestration component 120 may provide the sentiment score to a model-generation component 124. The model-generation component 124 may comprise a cloud-based machine-learning (ML) model service offered by the service provider 104. The model-generation component 124 may be configured to build, train, and deploy ML models at any scale utilizing input training data. The ML models may indicate a sentiment baseline, or a "normal" sentiment or attitude, for each user 108 towards the employer or organization.

At "4" of the sentiment-analysis process 112, the model-generation component 124 may determine whether the sentiment score/value deviates from the established sentiment baseline for the user(s) 108. If the model-generation component 124 determines that the sentiment score for the communication data deviates from the established baseline by more than a threshold deviation value, then the model-generation component 124 and/or the orchestration component 120 may determine that the user(s) 108 has become unhappy, or otherwise has developed a negative sentiment toward the employer or organization.

At "5" of the sentiment-analysis process 112, the orchestration component 120 may provide the deviation and/or sentiment score to be stored in one or more databases managed by a database-management component 126. The database-management component 126 may be a fully managed, flexible, non-relational database service that supports, among other technologies, document and key-value store models. The database-management component 126 may manage the deviation and/or sentiment scores, and associated the scores with an identity, or a hashed identity, of the respective user(s) 108.

In some examples, one or more admins 128 may be provided with access to the database(s) storing the deviation and/or sentiment scores. For instance, the admin(s) 128 may utilize receptive admin device(s) 130 to access, such as by providing authorized account credentials, to view or otherwise access the database(s). In some examples, the admin device(s) 130 may receive alerts indicating that a deviation of a sentiment score from an established baseline of a user 108 is greater than a threshold deviation. In other examples, the admin device(s) 130 may present a ranked listing of hashed user IDs and corresponding deviation values/scores. In this way, the admin(s) 128 may determine which users 108 have had the most significant negative deviation from their respective established baselines.

Figure 2:
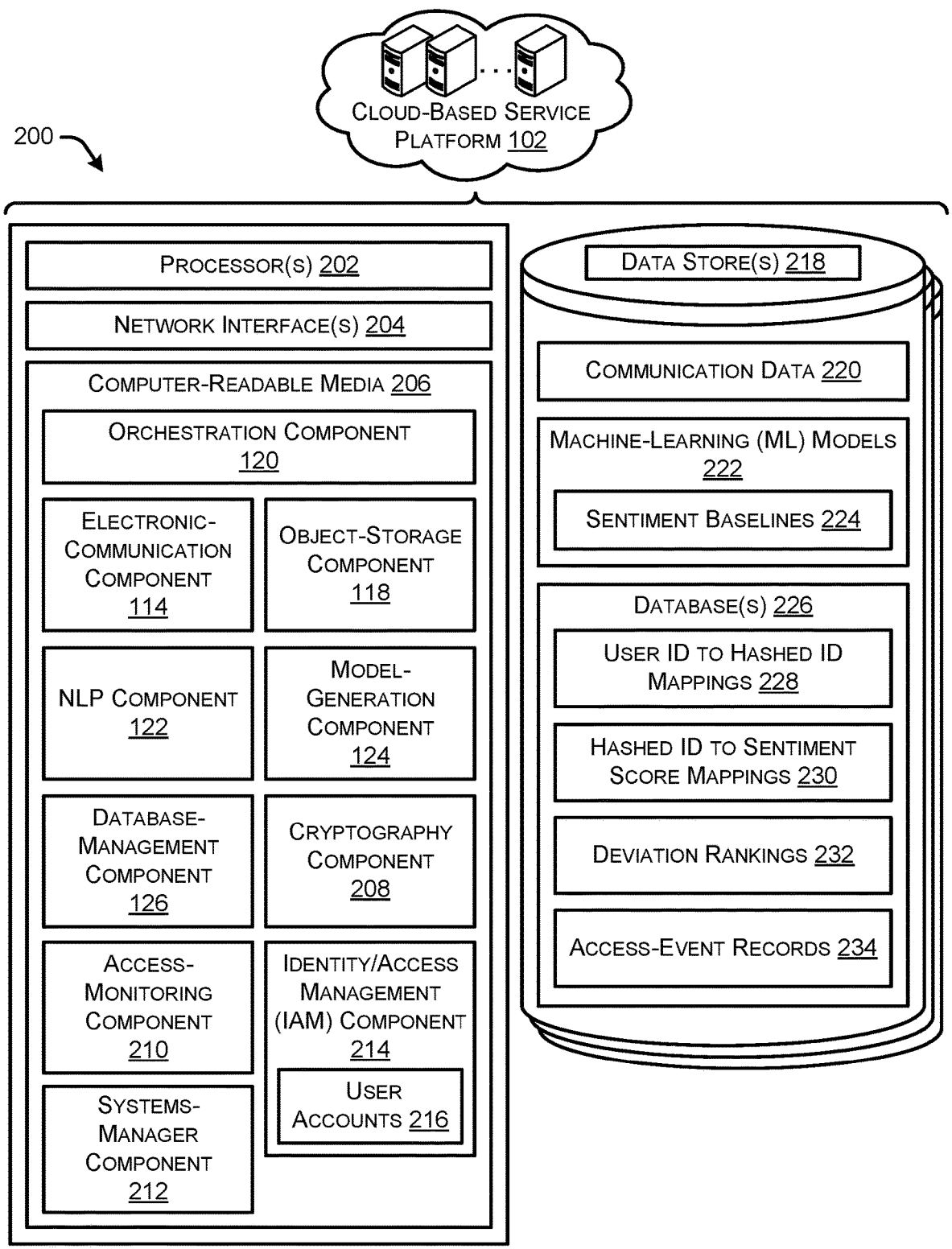
FIG. 2 illustrates a component diagram of an example cloud-based service platform that includes components to provide a sentiment-analysis service to identify users as having a negative sentiment towards an employer or organization.

FIG. 2 illustrates a component diagram of an example cloud-based service platform that includes components to provide a sentiment-analysis service to identify users as having a negative sentiment towards an employer or organization.

As illustrated, the cloud-based service platform 102 may include one or more hardware processors 202 (processors) configured to execute one or more stored instructions. The processor(s) 202 may comprise one or more cores. Further, the cloud-based service platform 102 may include one or more network interfaces 204 configured to provide communications between the cloud-based service platform 102 and other devices, such as the user device(s) 110, the admin device(s) 130, etc. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The cloud-based service platform 102 may also include computer-readable media 206 that stores various executable components (e.g., software-based components, firmware-based components, etc.). In addition to various components discussed in FIG. 1, the computer-readable-media 206 may further store a cryptography component 208, an access-monitoring component 210, a systems-manager component 212, and an identity/access management (IAM) component 214 that is associated with various user accounts 216.

As illustrated in FIG. 1 and discussed in FIG. 1, the computer-readable media 206 may store the orchestration component 120. Generally, the orchestration component 120 may allow entities, such as organizations, employers, and/or any type of individual users, to run or execute code without provisioning or managing service. For instance, applications or other code may be run without requiring administration. Entities that utilize the orchestration component 120 may upload code to the cloud-based service platform 102, and the orchestration component 120 may run and scale the code with high availability. Further, the code that is run by the orchestration component 120 can automatically trigger the use of other components or services provided by the service platform 104 (e.g., automatically calling the NLP component 122 to determine a sentiment score at "3" upon detecting communication data stored in a data store at "2").

The computer-readable media 206 may further store an electronic-communication component 114. The electronic-communication component 114 may be executable to perform communications on behalf of the users 110, such as a cloud-based email service, an instant-messaging service, a video-chat service, etc. In some examples, the electronic-communication component 114 may store, in one or more data stores 218, communication data 220 representing the communications of the user devices 110. In some examples, the electronic-communication component 114 may receive at least a portion of the communication data 220 from other communication services for use in sentiment analysis.

The computer-readable media 206 may further store an object-storage component 118 which may comprise a data-storage service that manages a computer data storage architecture that manages data as objects, and may be automatically scalable for large amounts of data. The communication data 220 may be stored in one or more data stores 218, or one or more repositories, or any other data-storage means and/or location. In some examples, the data store(s) 218 may be encrypted or otherwise restricted from access by various entities or users.

The computer-readable media 206 may further store the NLP component 122 that may be executable to use machine learning to find various insights and relationships in the text of the communication data 220 representing the communications of the users 108. For example, the NLP component 122 may analyze text of the communication data 220 to identify language of the text, extract key words, phrases, people, events, places, etc., and understand how positive or negative the text is. The text may be identified as including various negative aspects of an employee towards an employer, such as violence in the workplace, negative feelings towards the organization, desire to leave the organization, intent to leak confidential information, and so forth. In some examples, the NLP component 122 may be configured to output a numeric value, or other indication, indicating sentiment that is expressed by a user 108 in the communication data 220 towards an employer or organization.

The computer-readable media 206 may further store the model-generation component 124. The model-generation component 124 may comprise a cloud-based machine-learning (ML) model service offered by the service provider 104. The model-generation component 124 may be configured to build, train, and deploy ML models 222 at any scale utilizing input training data. The ML models 222 may indicate a sentiment baseline 224, or a "normal" sentiment or attitude, for each user 108 towards the employer or organization.

The ML models 222 may comprise any type of ML model 222, such as linear regression models, artificial neural networks, decision tree models, random forest models, and/or any other type of machine-learning models. The model-generation component 124 may further determine whether the sentiment score/value deviates from the established sentiment 224 baseline for the user(s) 108. If the model-generation component 124 determines that the sentiment score for the communication data 220 deviates from the established baseline 224 by more than a threshold deviation value, then the model-generation component 124 and/or the orchestration component 120 may determine that the user 108 has become unhappy, or otherwise has developed a negative sentiment toward the employer or organization.

The computer-readable media 206 may further store the database-management component 126 that may be a fully managed, flexible, non-relational database service that supports, among other technologies, document and key-value store models. The database-management component 126 may manage the deviation and/or sentiment scores, and associated the scores with an identity, or a hashed identity, of the respective user(s) 108.

The database-management component 126 may provide various databases 226 for use by the sentiment-analysis service 106. For example, the database-management component 126 may provide a database 226 that stores user ID to hashed ID mappings 228. In such examples, a cryptography component 208 may hash identity data representing an identity of a user 108 (e.g., email address, name, employee ID, etc.) in order to generate hashed identity data that cannot be utilized to identify the actual identity of the user 108. The user ID to hashed ID mappings may be stored in an encrypted database 226 such that only authorized users with authorized accounts may access the database 226 to determine a user identity that corresponds to a hashed identity. In this way, the real identities of users 108 may be protected until a de-anonymization process is performed by an admin 128 to determine the user ID for a hashed ID, such as by accessing the encrypted database 226 that stores the user ID to hashed ID mappings 228.

Further, the database-management component 126 may provide a database 226 that stores hashed ID to sentiment score mappings 230 in order to determine sentiment scores for users 110. Additionally, the database-management component 126 may provide another database 226 that stores deviation rankings 232 which indicate, for a group of users 108, the users 108 whose negative deviations from their sentiment baseline 224 are highest, and may require attention. To protect the sensitive data, each of the databases 226 may be stored in different data stores 218, and/or other separate storage locations, and encrypted to prevent unauthorized access to the data stored in the databases 226.

The computer-readable media 206 may further store an access-monitoring component 210 that monitors access to various data stores 218 and/or databases 226. For instance, if an authorized user (e.g., admin 128) utilizes sign-in credentials to access a database 226 and/or a data store 218, the access-monitoring component 210 may identify and log or record that access event. In this way, authorized users may also be monitored to ensure that access events to the databases 226 and/or the data stores 218 are proper and necessary.

The computer-readable media 206 may store an identity and access management (IAM) component 214. To utilize the services provided by the service provider 104, users 108 and/or admins 128 (e.g., employers) may register for an account with the cloud-based service platform 102. For instance, users 108 and/or admins 128 may utilize their devices 110/130 to interact with the identity and access management (IAM) component 214 that allows the users 108 and/or admins 128 to create user accounts 216 with the cloud-based service platform 102. Generally, the IAM component 214 may enable users 108 and/or admins 128 to manage access to their cloud-based services and computing resources securely. Using the IAM component 214, users 108 and/or admins 128 can provide input, such as requests for use of the sentiment-analysis service 106. Each user 108 and/or admins 128 that is permitted to interact with services associated with a particular account 216 may have a user identity/profile assigned to them. In this way, users 108 and/or admins 128 may log in with sign-in credentials to their account(s) 216, perform operations such as accessing data stores 218 and/or databases 226, and any changes or operations performed by that user 108 and/or admins 128 may be tracked by the access-monitoring component 210 for that user account 216 for auditing purposes.

The cloud-based service platform 102 may include a systems-manager component 212 that provides a management/interaction platform and interface to entities that are registered for services supported by at least the computing resources. To utilize the services provided by the service provider 104, users 108 and/or admins 128 may register for an account 216 with the cloud-based service platform 102. For instance, users 108 and/or admins 128 may utilize devices 110/130 to interact with the IAM component 214 that allows the user 108 and/or admin 128 to create an account with the cloud-based service platform 102. Generally, the IAM component 214 may enable users 108 and/or admins 128 to manage access to their cloud-based services and computing resources securely.

Figure 3:
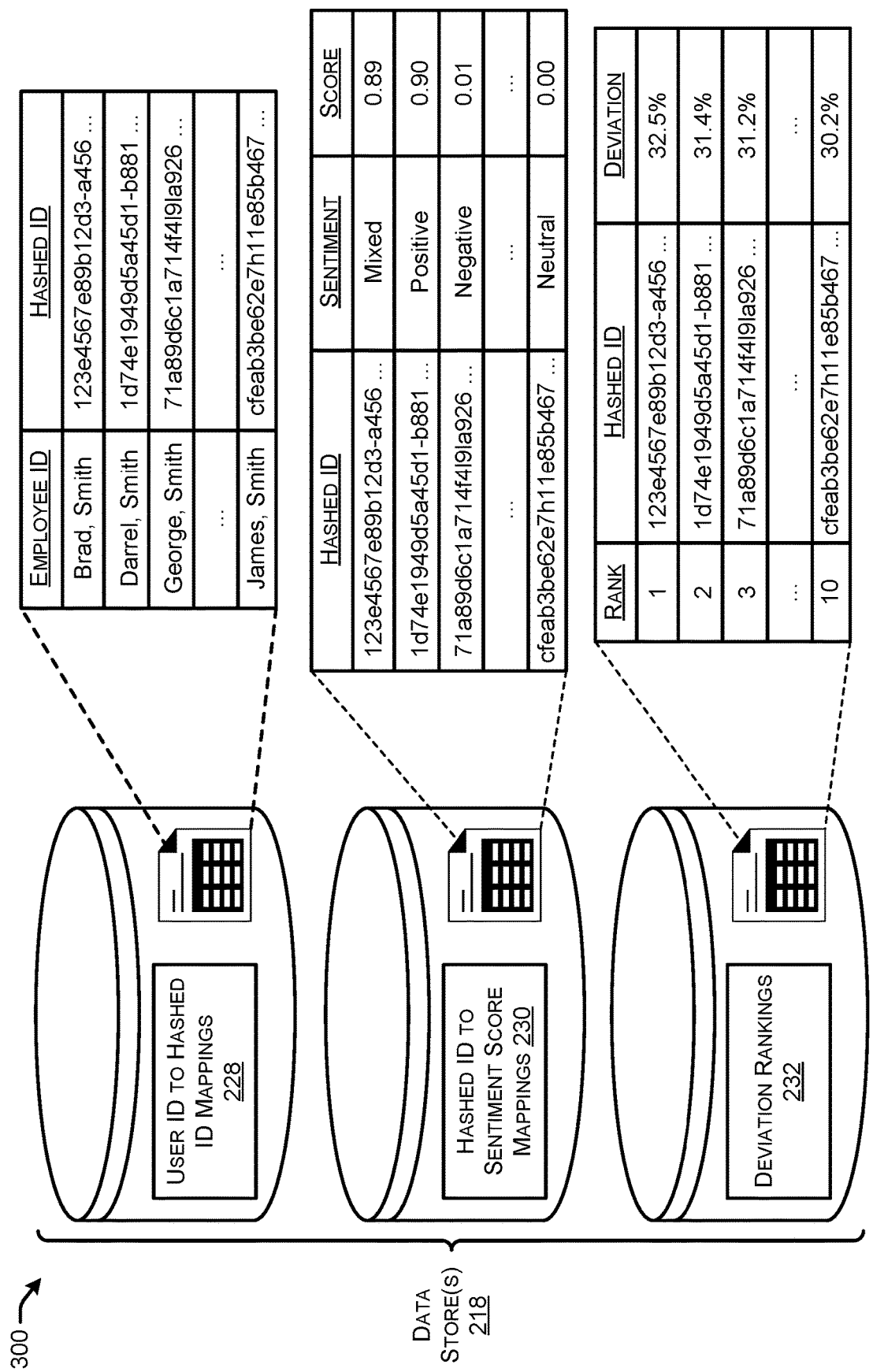
FIG. 3 illustrates example data stores that store various databases utilized to store sentiment-related data according to techniques described herein.

FIG. 3 illustrates an example environment 300 in which example data stores that store various databases utilized to store sentiment-related data according to techniques described herein.

As illustrated, a first data store 218 may include the user ID to hashed ID mappings 228 for the users 108. In the illustrated example, the user IDs are employee names, and the hashed IDs are determined using MD5 hash functions. The data store 218 and/or database 226 storing the user ID to hashed ID mappings 228 may be encrypted such that only authorized users can access the data stored therein. For instance, if an authorized employee determines that a user needs to be talked to based on their deviation ranking 232, the authorized user may access the data store 218 using their user account 216 credentials to view the mappings 228 between the hashed ID and the user ID.

Additionally, a second data store 218 may include the hashed ID to sentiment score mappings 230 for the users 108. In the illustrated example, the hashed IDs may be hashes of the employee names that are determined using hash functions, such as MD5 hash functions. The data store 218 and/or database 226 storing the hashed ID to sentiment score mappings 230 may be encrypted such that only authorized users can access the data stored therein. For instance, if an authorized employee determines that a user needs to be talked to based on their deviation ranking 232, the authorized user may access the data store 218 using their user account 216 credentials to view the mappings 230 between the hashed ID and the sentiment scores. As shown, the sentiment may indicate whether sentiment is positive towards an employer, negative towards an employer, mixed, and also a score of how positive/negative the sentiment of the employee is towards the employer. However, any other data may be utilized to indicate sentiment.

As shown, a third data store 218 may include deviation rankings 232 for the hash ID's of the users 108. In the illustrated example, the hashed IDs may be ranked based on how much a sentiment score deviates from an established baseline for a user 108. In this way, hashed IDs for users 108 may be identified based on their ranking in order to identify hashed IDs that have a significant negative deviation from an established baseline. A reviewing entity, such as an HR employee for the employer, may determine that a deviation from an established baseline violates some threshold, and determine that the user 108 needs to be talked to. The HR employee may then determine, using the user ID to hashed ID mappings 228, the employee ID for the hashed ID with a high deviation from the sentiment baseline.

hashed IDs may be hashes of the employee names that are determined using hash functions, such as MD5 hash functions. The data store 218 and/or database 226 storing the hashed ID to sentiment score mappings 230 may be encrypted such that only authorized users can access the data stored therein. For instance, if an authorized employee determines that a user needs to be talked to based on their deviation ranking 232, the authorized user may access the data store 218 using their user account 216 credentials to view the mappings 230 between the hashed ID and the sentiment scores.

Figure 4A:
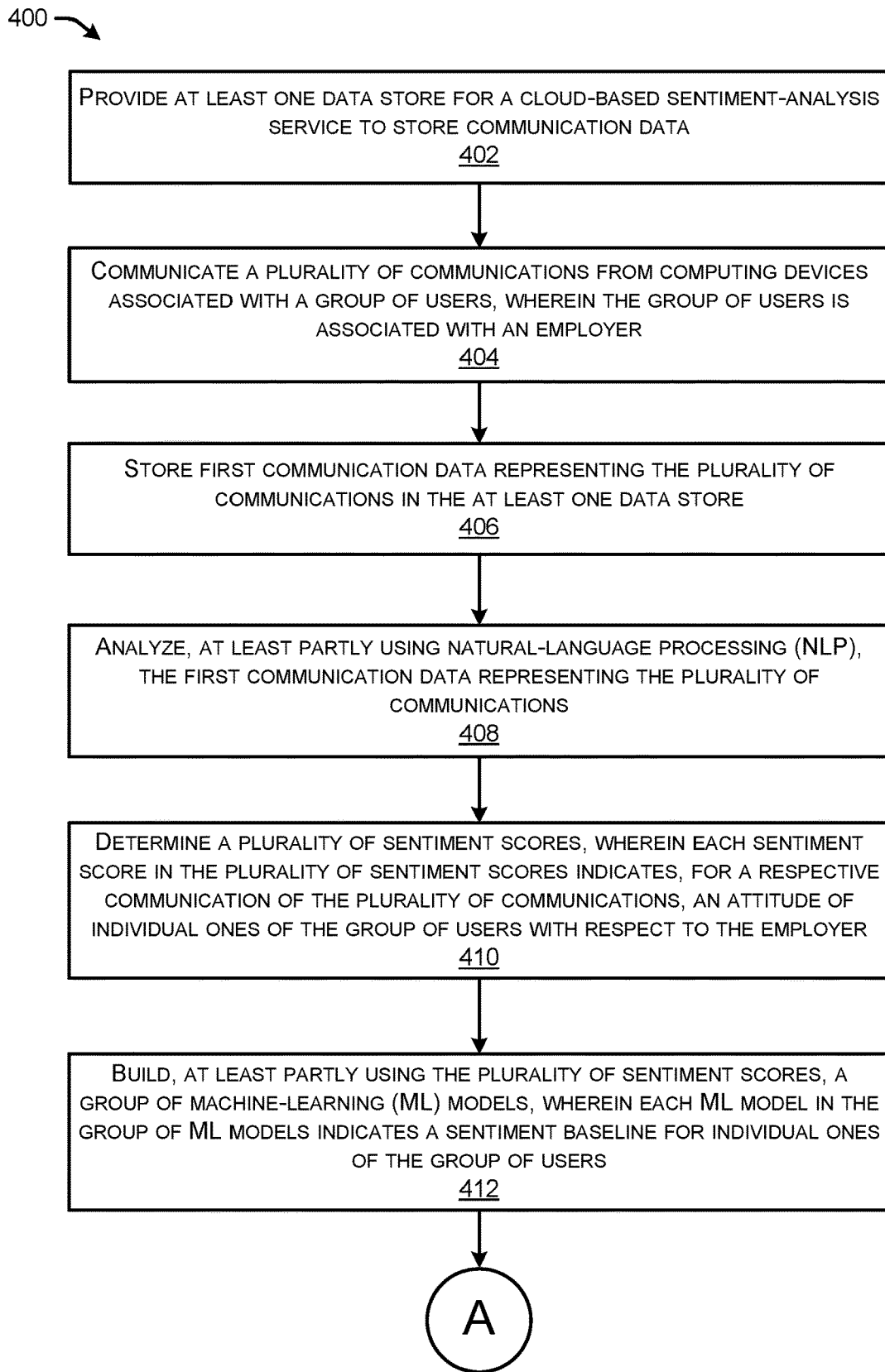
FIGS. 4A and 4B illustrate a flow diagrams of an example method for performing sentiment-analysis techniques to identify users as having a negative sentiment towards an employer or organization.
Figure 4B:
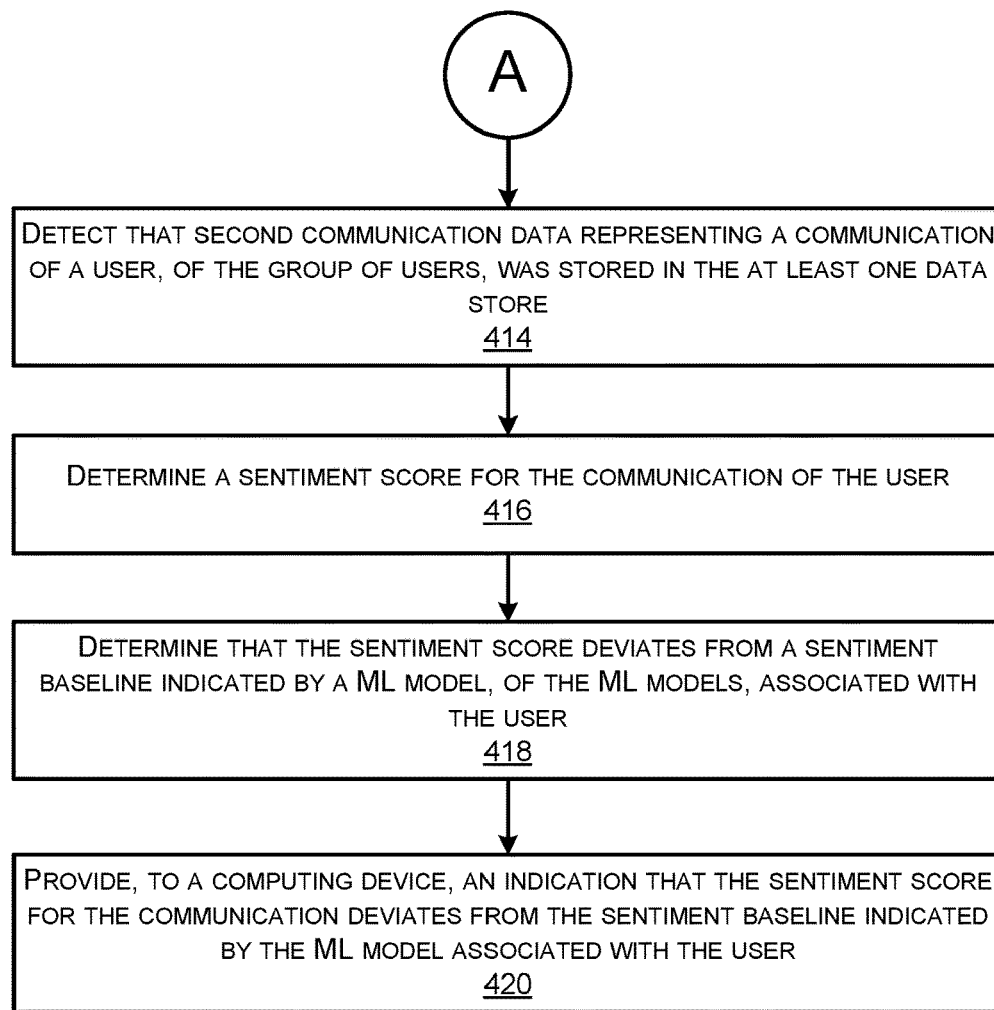
Figure 5:
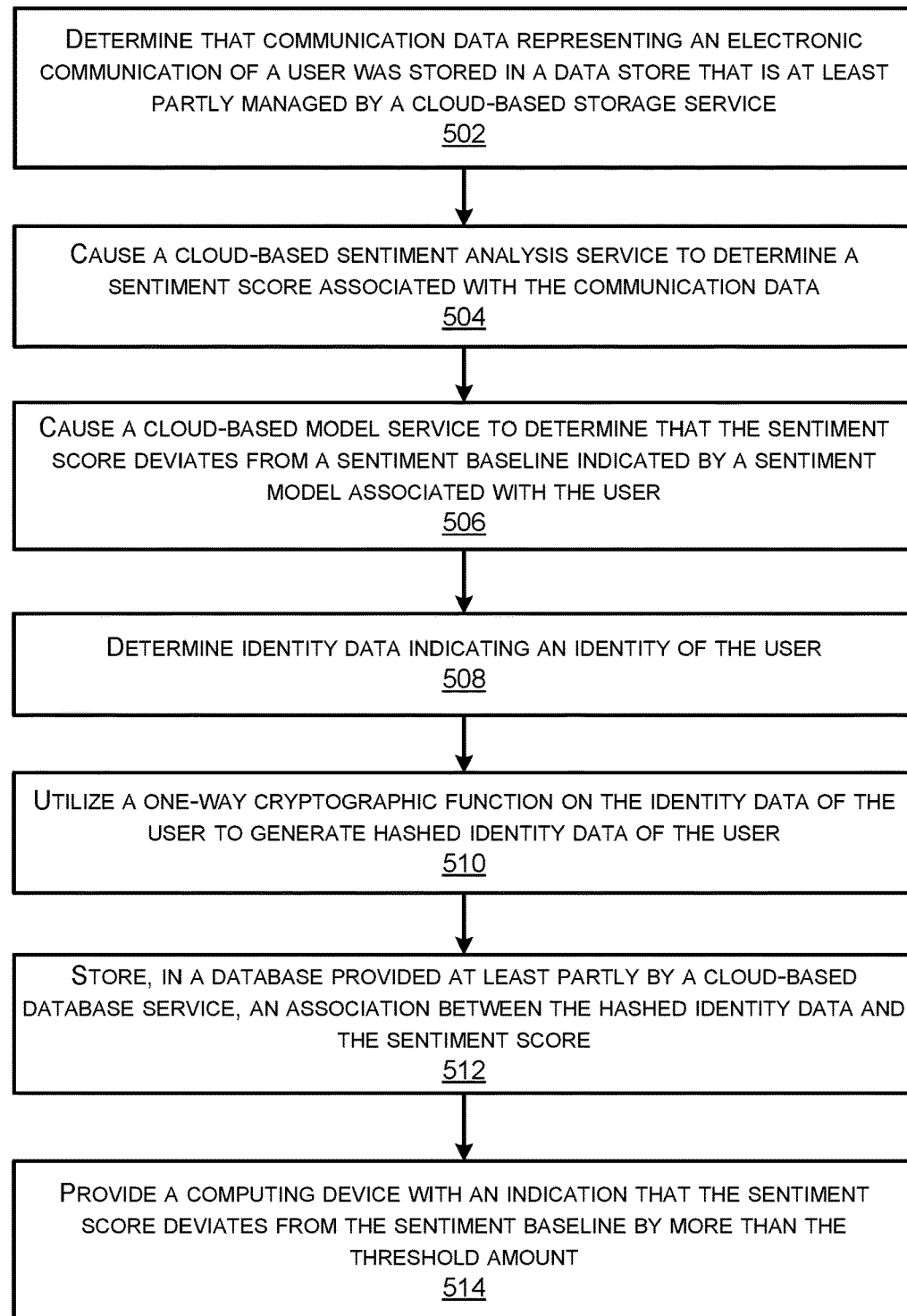
FIG. 5 illustrates a flow diagram of another example method for performing sentiment-analysis techniques to identify users as having a negative sentiment towards an employer or organization.

FIGS. 4A, 4B, and 5 illustrate flow diagrams of example methods 400 and 500 that illustrate aspects of the functions performed at least partly by the cloud-based service platform 102 as described in FIGS. 1-3. The logical operations described herein with respect to FIGS. 4A, 4B, and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4A, 4B, and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIGS. 4A and 4B illustrate a flow diagrams of an example method for performing sentiment-analysis techniques to identify users as having a negative sentiment towards an employer or organization.

At 402, a cloud-based service platform 102 may provide at least one data store for a cloud-based sentiment analysis service 106 to store communication data 220. For example, the cloud-based service platform 102 may provide, to entities, a service provided by an object-storage component 118.

At 404, the cloud-based service platform 102 may communicate a plurality of communications from computing devices associated with a group of users. In some examples, the group of users may be associated with the same employer and/or organization. The cloud-based service platform 102 may, for example, provide a service that is supported by the electronic-communication component 114 to enable user devices 108 to send communication data 220.

At 406, the cloud-based service platform 102 may store first communication data representing the plurality of communications in the at least one data store. For example, the electronic-communication component 114 may store communication data 220 in at least one data store 118.

At 408, the cloud-based service platform 102 may analyze, at least partly using natural language processing (NLP), the first communication data representing the plurality of communications. For example, the NLP component 122 may be provided and analyze the communication data 220 using NLP techniques.

At 410, the cloud-based service platform 102 may determine a plurality of sentiment scores. In some examples, each sentiment score in the plurality of sentiment scores indicates, for a respective communication of the plurality of communications, an attitude of individual ones of the group of users with respect to the employer. For example, the NLP component 122 may, based on the analyzing using NLP, determine sentiment scores for communications represented by the communication data 220 for each of the users 108.

At 412, the cloud-based service platform 102 may build, at least partly using the plurality of sentiment scores, a group of machine-learning (ML) models. In some examples, each ML model in the group of ML models indicates a sentiment baseline for individual ones of the group of users. For instance, the model-generation component 124 may build and/or train ML models 22 that indicate sentiment baselines 224 for each of the users 108 in the group.

At 414, the cloud-based service platform 102 may detect that second communication data representing a communication of a user was stored in the at least one data store. For example, code executing on the orchestration component 120 may detect that the electronic-communication component 114 placed communication data 220 representing a communication of a user 108 in at least one data store 218.

At 416, the cloud-based service platform 102 may determine a sentiment score for the communication of the user. For example, the NLP component 122 may analyze the second communication data 220 and identify a sentiment score for the communication of the user 108.

At 418, the cloud-based service platform 102 may determine that the sentiment score deviates from a sentiment baseline indicated by a ML model associated with the user 108. For instance, the model-generation component 124 may determine that the sentiment score deviates from a sentiment baseline 224 indicated by the ML model 222 that was built for the user 108.

At 420, the cloud-based service platform 102 may provide, to a computing device associated with at least one of the service provider or the employer, an indication that the sentiment score for the communication deviates from the sentiment baseline indicated by the ML model associated with the user. As an example, an alert may be sent to the admin device 130, and/or the admin device 130 may be provided with access to one or more databases 226 storing the sentiment score for the communication.

In some examples, the data store may comprise a first data store, and the cloud-based service platform 102 may further identify, from the communication data, identity data indicating an identity of the user, utilize a hashing function on the identity data of the user to generate hashed identity data of the user, and store, at least partly using the cloud-based database-management service and in database stored in a second data store of the plurality of data stores, a mapping between the hashed identity data of the user and the sentiment score for the communication of the user.

FIG. 5 illustrates a flow diagram of another example method for performing sentiment-analysis techniques to identify users as having a negative sentiment towards an employer or organization.

At 502, a cloud-based service platform 102 may determine that communication data representing an electronic communication of a user was stored in a data store that is at least partly managed by a cloud-based storage service. For instance, the orchestration component 120 may determine that communication data 220 was stored in a data store 218 that is at least partly managed by the object-storage component 118.

At 504, the cloud-based service platform 102 may cause a cloud-based sentiment-analysis service to determine a sentiment score associated with the communication data, wherein the sentiment score indicates an attitude of the user with respect to an entity associated with the user. For instance, the orchestration component 120 may cause the NLP component 122 to determine a sentiment score for communication data 220 representing a communication of a user 108.

At 506, the cloud-based service platform 102 may cause a cloud-based model service to determine that the sentiment score deviates from a sentiment baseline associated with the user. For instance, the model-generation component 124 may determine that the sentiment score deviates from a sentiment baseline 224 associated with the user.

At 508, the cloud-based service platform 102 may determine identity data indicating an identity of the user. As an example, the sentiment-analysis service 106 may determine, from the communication data 220, an identity of the use 108 (e.g., email address, name, employee ID, and/or any other identifier).

At 510, the cloud-based service platform 102 may utilize a one-way cryptographic function on the identity data of the user to generate hashed identity data of the user. For example, the cryptography component 208 may utilize a one-way cryptographic function on the identity data to generate hashed identity data for the user 108 to mask the identity of the user.

At 512, the cloud-based service platform 102 may store, in a database provided at least partly by a cloud-based database service, an association between the hashed identity data and the sentiment score. For instance, the database-management component 126 may manage a database 226 that stores hashed ID to sentiment score mappings 230.

At 514, the cloud-based service platform 102 may provide a computing device with an indication that the sentiment score deviates from the sentiment baseline by more than the threshold amount. In some examples, an admin device 130 may have access to the database 226 that stores the hashed ID to sentiment score mappings 230.

In some instances, after determining the sentiment score associated with the communication data, the cloud-based service platform 102 may remove the communication data from the data store.

In various examples, the communication data representing the electronic communication may be received in real-time or near-real-time as the user communications the electronic communication. Thus, an employer (or other associated entity) may determine a deviation in near-real-time and take responsive actions.

In some instances, the cloud-based storage service, the cloud-based sentiment-analysis service, the cloud-based model service, and the cloud-based database service are associated with a same cloud-based service provider.

In some examples, a cloud-based monitoring service may identify an access event in which a computing device accessed the second database, and store a record indicating a user account associated with the access event.

In some instances, the cloud-based service platform 102 may determine a deviation value indicating a measure of the sentiment score deviating from the sentiment baseline, rank the user in a listing of other users associated with the entity based at least in part on the deviation value of the user, and provide a computing device associated with the entity with access to the listing.

Figure 6:
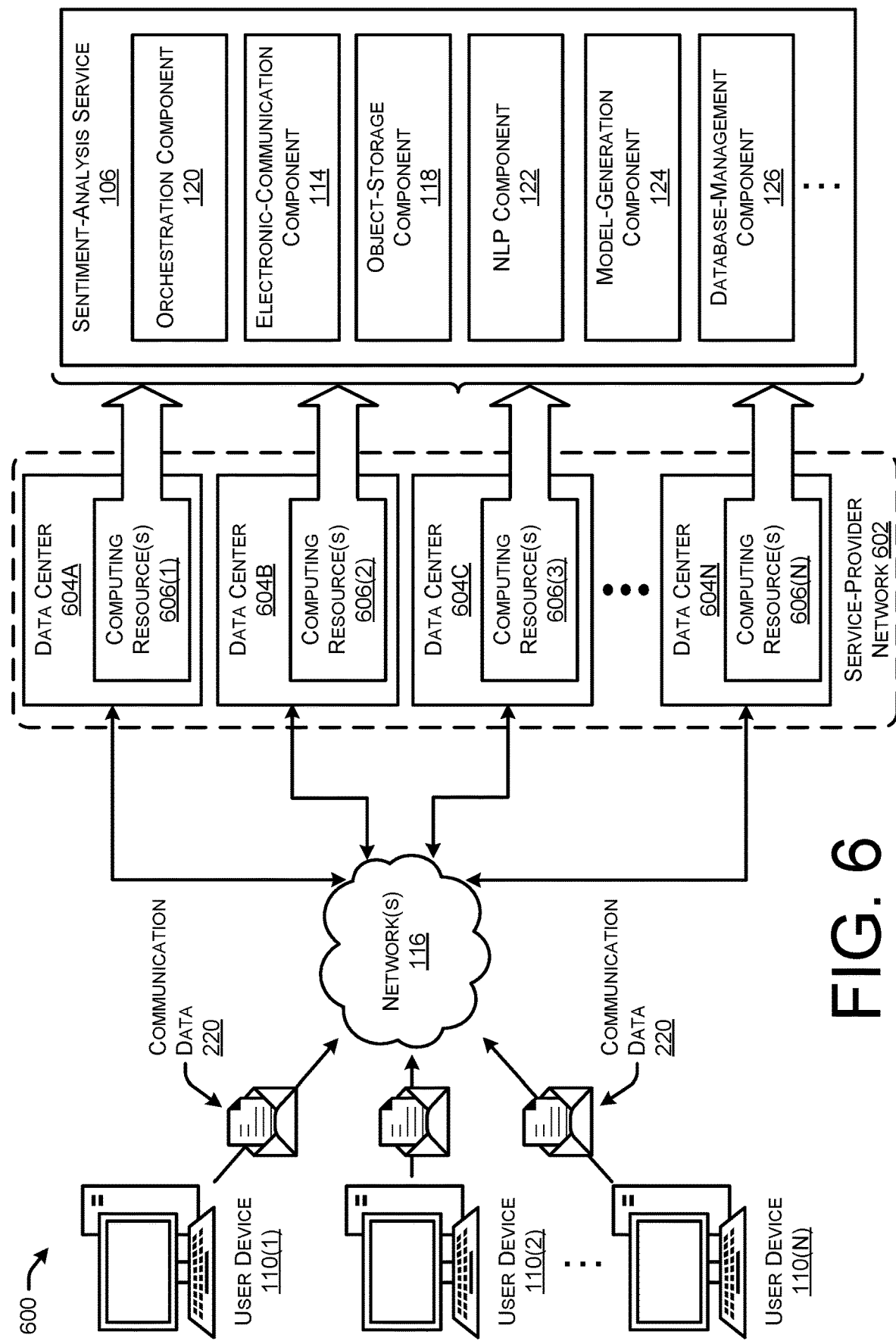
FIG. 6 is a system and network diagram that shows an illustrative operating environment that includes a service provider network that can be configured to implement aspects of the functionality described herein.

FIG. 6 is a system and network diagram that shows an illustrative operating environment 600 that includes a service-provider network 602 (that may be part of or associated with the cloud-based service platform 102) that can be configured to implement aspects of the functionality described herein.

The service-provider network 602 can provide computing resources 606, like VM instances and storage, on a permanent or an as-needed basis. Among other types of functionality, the computing resources 606 provided by the service-provider network 602 may be utilized to implement the various services described above. As also discussed above, the computing resources provided by the cloud-based service platform 102 can include various types of computing resources, such as data processing resources like VM instances, data storage resources, networking resources, data communication resources, application-container/hosting services, network services, and the like.

Each type of computing resource provided by the service-provider network 602 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service-provider network 602 can also be configured to provide other types of computing resources not mentioned specifically herein.

The computing resources 606 provided by the service-provider network 602 may be enabled in one embodiment by one or more data centers 604A-604N (which might be referred to herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative embodiment for a data center 604 that can be utilized to implement the technologies disclosed herein will be described below with regard to FIG. 6.

The data centers 604 may be configured in different arrangements depending on the service-provider network 602. For example, one or more data centers 604 may be included in or otherwise make-up an availability zone. Further, one or more availability zones may make-up or be included in a region. Thus, the service-provider network 602 may comprise one or more availability zones, one or more regions, and so forth. The regions may be based on geographic areas, such as being located within a predetermined geographic perimeter.

The users 108 and/or admins 130 of the service-provider network 602 may access the computing resources 606 provided by the data centers 604 of the service-provider network 602 over any wired and/or wireless network(s) 116 (utilizing a user device 110, admin device 130, and/or another accessing-user device), which can be a wide area communication network ("WAN"), such as the Internet, an intranet or an Internet service provider ("ISP") network or a combination of such networks. For example, and without limitation, a user device 110 operated by user 108 of the service-provider network 602 may be utilized to access the service-provider network 602 by way of the network(s) 116. It should be appreciated that a local-area network ("LAN"), the Internet, or any other networking topology known in the art that connects the data centers 604 to remote clients and other users can be utilized. It should also be appreciated that combinations of such networks can also be utilized.

In some examples, one or more of the data centers 604 may support the hardware and/or software required to implement the sentiment-analysis service 106. For instance, various components of the sentiment-analysis service 106, such as the orchestration component 120, electronic-communication component 114, object-storage component 118, NLP component 122, model-generation component 124, database-management component 126, etc., may be supported by computing resources 660 in one or more of the data centers 604. For instance, at least a portion of the sentiment-analysis service 106 may be stored in and executed by memory and processors of the computing resources 606. Further, the user devices 110 may be supported by the computing resources 606 of the data centers 604. For instance, the electronic-communication component 114 may enable the sending and/or receiving of the communication data 220 over the networks 116 for the user devices 110.

Figure 7:
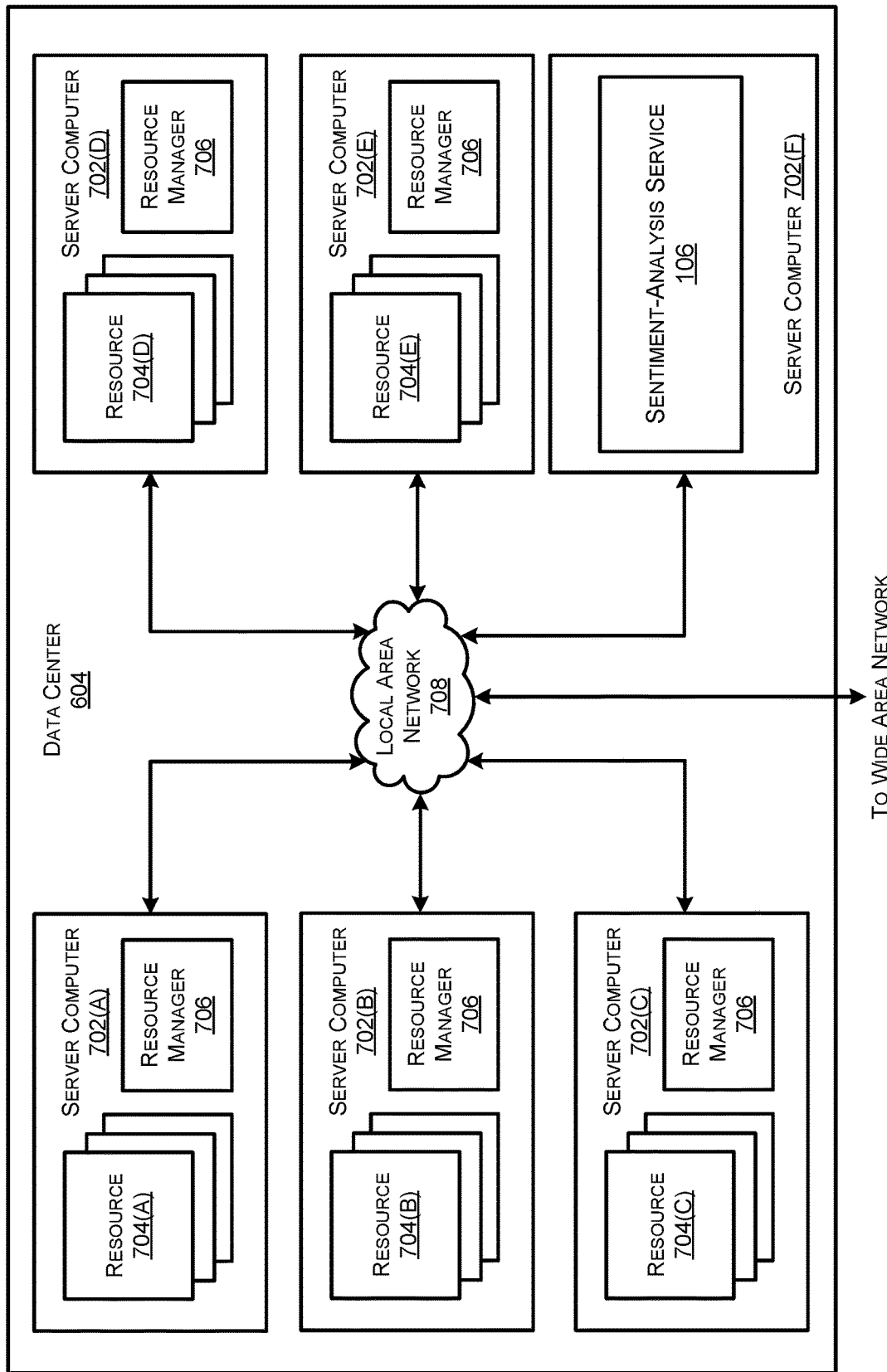
FIG. 7 is a computing system diagram illustrating a configuration for a data center that can be utilized to implement aspects of the technologies disclosed herein.

FIG. 7 is a computing system diagram illustrating a configuration for a data center 604 that can be utilized to implement aspects of the technologies disclosed herein. The example data center 604 shown in FIG. 7 includes several server computers 702A-702F (which might be referred to herein singularly as "a server computer 702" or in the plural as "the server computers 702") for providing computing resources 704A-704E. In some examples, the resources 704 and/or server computers 702 may include, or correspond to, the computing resources 606 described herein.

The server computers 702 can be standard tower, rack-mount, or blade server computers configured appropriately for providing the computing resources described herein (illustrated in FIG. 7 as the computing resources 704A-704E). As mentioned above, the computing resources provided by the service-provider network 602 can be data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 604 can also be configured to provide network services and other types of services.

In the example data center 604 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 804A-804N, between each of the server computers 702A-702F in each data center 604, and, potentially, between computing resources in each of the server computers 702. It should be appreciated that the configuration of the data center 604 described with reference to FIG. 7 is merely illustrative and that other implementations can be utilized. As shown, at least a portion of the sentiment-analysis service 106 may be hosted by one or more service computers 702 included in a data center 604.

Figure 8:
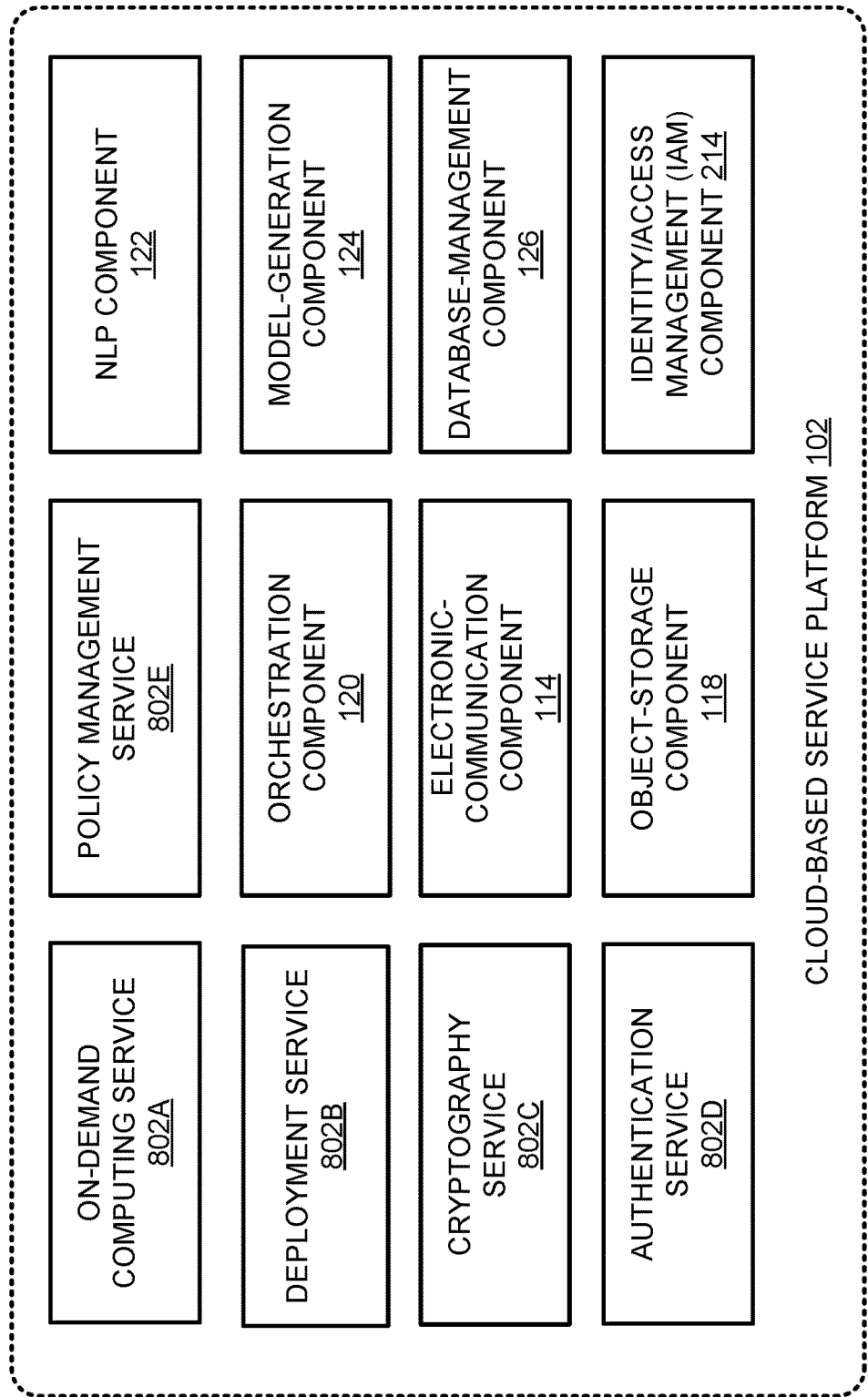
FIG. 8 is a network services diagram that shows aspects of several services that can be provided by and utilized within a system, or a larger system of which the system is a part, which is configured to implement the various technologies disclosed herein.

FIG. 8 is a network services diagram that shows aspects of several services that can be provided by and utilized within a system, or a larger system of which the system is a part, which is configured to implement the various technologies disclosed herein. In particular, and as discussed above, the cloud-based service platform 102 can provide a variety of network services to customers and other users of the cloud-based service platform 102 including, but not limited to, the orchestration component 120, the electronic communication component 114, the object-storage component 118, the NLP component 122, the model-generation component 124, the database-management component 126, and the IAM component 214. One or all of these components may be offered to users or customers as services. The cloud-based service platform 102 can also provide other types of services including, but not limited to, an on-demand computing service 802A, a deployment service 802B, a cryptography service 802C, an authentication service 802D, and/or a policy management service 802E, some of which are described in greater detail below. Additionally, the service-provider 104 can also provide other services, some of which are also described in greater detail below.

It should be appreciated that customers of the cloud-based service platform 102 can include organizations or individuals that utilize some or all of the services provided by the cloud-based service platform 102. As described herein, a customer or other user can communicate with the cloud-based service platform 102 through a network, such as the network 116 shown in FIGS. 1 and 7. Communications from a customer computing device, such as the user devices 110 and admin devices 130 shown in FIG. 1, to the cloud-based service platform 102 can cause the services provided by the cloud-based service platform 102 to operate in accordance with the described configurations or variations thereof.

It is noted that not all embodiments described include the services described with reference to FIG. 8 and that additional services can be provided in addition to or as an alternative to services explicitly described. Each of the services shown in FIG. 8 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 802A to store data in or retrieve data from a storage service). Additional details regarding some of the services shown in FIG. 8 will now be provided.

As discussed above, the on-demand computing service 802A can be a collection of computing resources configured to instantiate VM instances and to provide other types of computing resources on demand. For example, a customer or other user of the cloud-based service platform 102 can interact with the on-demand computing service 802A (via appropriately configured and authenticated network services API calls) to provision and operate VM instances that are instantiated on physical computing devices hosted and operated by the cloud-based service platform 102.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 802A is shown in FIG. 8, any other computer system or computer system service can be utilized in the cloud-based service platform 102, such as a computer system or computer system service that does not employ virtualization and instead provisions computing resources on dedicated or shared computers/servers and/or other physical devices.

A storage service (e.g., other services 802F) can include software and computing resources that collectively operate to store data using block or file-level storage devices (and/or virtualizations thereof). The storage devices of the storage service 802F can, for instance, be operationally attached to virtual computer systems provided by the on-demand computing service 802A to serve as logical units (e.g., virtual drives) for the computer systems. A storage device can also enable the persistent storage of data used/generated by a corresponding virtual computer system where the virtual computer system service might only provide ephemeral data storage.

The cloud-based service platform 102 can also include a cryptography service 802C. The cryptography service 802C can utilize storage services of the cloud-based service platform 102, such as the storage service 802F, to store encryption keys in encrypted form, whereby the keys are usable to decrypt customer keys accessible only to particular devices of the cryptography service 802C. The cryptography service 802C can also provide other types of functionality not specifically mentioned herein.

As illustrated in FIG. 8, the cloud-based service platform 102, in various embodiments, also includes an authentication service 802D and a policy management service 802E. The authentication service 802D, in one example, is a computer system (i.e., collection of computing resources) configured to perform operations involved in authentication of users. For instance, one of the services 802 shown in FIG. 8 can provide information from a user to the authentication service 802D to receive information in return that indicates whether or not the requests submitted by the user are authentic.

The policy management service 802E, in one example, is a network service configured to manage policies on behalf of customers or internal users of the cloud-based service platform 102. The policy management service 802E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The cloud-based service platform 102 can additionally maintain other services 802F based, at least in part, on the needs of its customers. For instance, the cloud-based service platform 102 can maintain a deployment service 802B for deploying program code and/or a data warehouse service in some embodiments. Other services include object-level archival data storage services, database services, and services that manage, monitor, interact with, or support other services. The cloud-based service platform 102 can also be configured with other services not specifically mentioned herein in other embodiments. The cloud-based service platform 102 can additionally maintain and provide services described herein, such as the automated-translation component 212, the code-build component 214, and/or the translation service 116. Functionality of these components are described above, and throughout.

Figure 9:
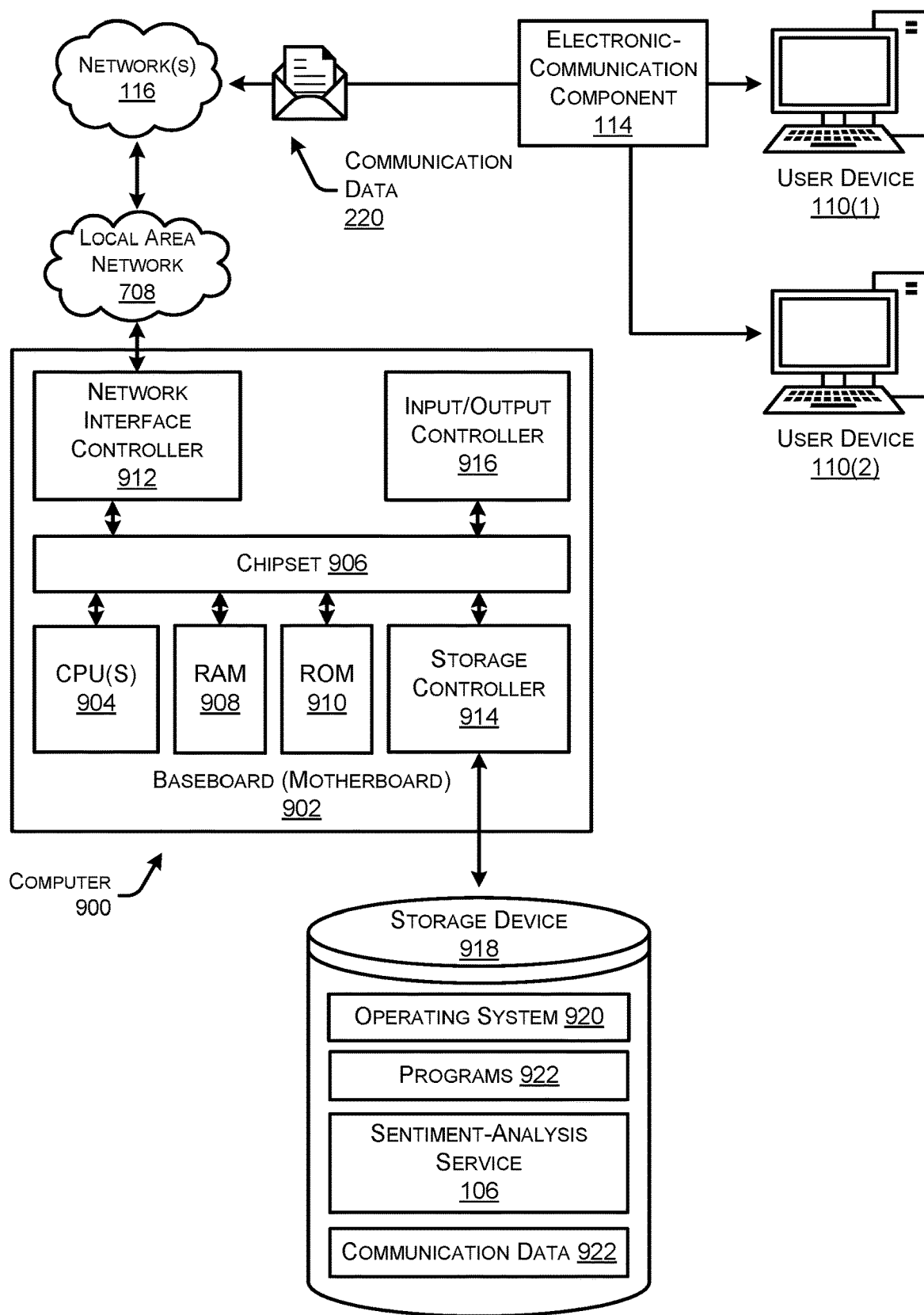
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 708. The chipset 906 can include functionality for providing network connectivity through a NIC 9912, such as a gigabit Ethernet adapter. The NIC 912 is capable of connecting the computer 900 to other computing devices over the network 708 (or 116). It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the cloud-based service platform 102, and or any components included therein, may be supported by one or more devices similar to computer 900. Stated otherwise, some or all of the operations performed by the service-provider network 602, and or any components included therein, may be performed by one or more computer devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 918 can store other system or application programs and data utilized by the computer 900.

In one embodiment, the mass storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-8. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors;
a cloud-based object storage service operated by a service provider and comprising first computer-executable instructions that, when executed, cause the one or more processors to store communication data in a plurality of data stores;
a cloud-based electronic communication service operated by the service provider and comprising second computer-executable instructions that, when executed, cause the one or more processors to:
send a plurality of communications from computing devices associated with a group of users, wherein the group of users is associated with an entity; and
store first communication data representing the plurality of communications in a data store of the plurality of data stores;
a cloud-based sentiment-analysis service operated by the service provider and comprising third computer-executable instructions that, when executed, cause the one or more processors to:
analyze, at least partly using natural-language processing (NLP), the first communication data representing the plurality of communications; and
determine, based at least in part on the analyzing, a plurality of sentiment scores, wherein each sentiment score in the plurality of sentiment scores indicates, for a respective communication of the plurality of communications, an attitude of individual ones of the group of users with respect to the entity;
a cloud-based model-generation service operated by the service provider and comprising fourth computer-executable instructions that, when executed, cause the one or more processors to:
build, at least partly using the plurality of sentiment scores, a group of machine-learning (ML) models, wherein each ML model in the group of ML models indicates a sentiment baseline for individual ones of the group of users; and
identify, at least partly using ML models, deviations from the sentiment baselines for sentiment scores of subsequent communications of the group of users;
one or more computer-readable media storing fifth computer-executable instructions that, when executed, cause the one or more processors to:
detect that the cloud-based electronic communication service stored second communication data representing a communication of a user, of the group of users, in the data store;
determine, at least partly responsive to the detecting and at least partly using the cloud-based sentiment-analysis service and the communication data, a sentiment score for the communication of the user;
determine, at least partly using the cloud-based model-generation service, that the sentiment score deviates from a sentiment baseline indicated by a ML model, of the ML models, associated with the user; and
providing, to a computing device associated with at least one of the service provider or the entity, an indication that the sentiment score for the communication deviates from the sentiment baseline indicated by the ML model associated with the user.

2. The system of claim 1, further comprising a cloud-based database-management service operated by the service provider and comprising sixth computer-executable instructions that, when executed, cause the one or more processors to manage at least a portion of the data stored in the data stores,
wherein:
the data store comprises a first data store; and
the fifth computer-executable instructions further cause the one or more processors to:
identify, from the communication data, identity data indicating an identity of the user;
utilize a hashing function on the identity data of the user to generate hashed identity data of the user; and
store, at least partly using the cloud-based database-management service and in database stored in a second data store of the plurality of data stores, a mapping between the hashed identity data of the user and the sentiment score for the communication of the user.

3. The system of claim 2, further comprising a cloud-based monitoring service operated by the service provider and comprising sixth computer-executable instructions that, when executed, cause the one or more processors to:
identify an access event in which a user account accessed the second data store that stores the database; and
store a record indicating the user account of the access event.

4. The system of claim 1, further comprising a cloud-based code-execution service operated by the service provider and comprising sixth computer-executable instructions that, when executed, cause the one or more processors to:
cause the fifth computer-executable instructions to execute by the one or more processors at least partly responsive to the detecting that the cloud-based electronic communication service stored the second communication data in the data store.

5. A computer-implemented method comprising:
determining that communication data representing an electronic communication of a user was stored in a data store that is at least partly managed by a cloud-based storage service;
causing a cloud-based sentiment-analysis service to determine a sentiment score associated with the communication data, wherein the sentiment score indicates an attitude of the user with respect to an entity associated with the user;
causing a cloud-based model service to determine that the sentiment score deviates from a sentiment baseline associated with the user;
determining identity data indicating an identity of the user;
utilizing a one-way cryptographic function on the identity data of the user to generate hashed identity data of the user; and
storing, in a database provided at least partly by a cloud-based database service, an association between the hashed identity data and the sentiment score,
wherein the cloud-based storage service, the cloud-based sentiment-analysis service, the cloud-based model service, and the cloud-based database service are provided by a same cloud-based service provider.

6. The computer-implemented method of claim 5, further comprising, subsequent to determining the sentiment score associated with the communication data, removing the communication data from the data store.

7. The computer-implemented method of claim 5, wherein the communication data comprises first communication data, further comprising:
receiving second communication data representing a plurality of electronic communications of the user;
causing the cloud-based sentiment-analysis service to determine a plurality of sentiment scores, each sentiment score in the plurality of sentiment scores corresponding to a respective electronic communication of the plurality of electronic communications; and
causing the cloud-based model service to build a model that indicates the sentiment baseline at least partly using the plurality of sentiment scores and the second communication data representing the plurality of electronic communications, wherein the model comprises a machine-learning model.

8. The computer-implemented method of claim 5, further comprising receiving, at least partly using a cloud-based electronic communication service, the communication data representing the electronic communication in real-time or near-real-time as the user communicates the electronic communication.

9. The computer-implemented method of claim 5, wherein the database comprises a first database, the association comprises a first association, further comprising:
storing, in a second database provided at least partly by the cloud-based database service, a second association between the identity data of the user and the hashed identity data of the user.

10. The computer-implemented method of claim 9, further comprising:
determining that the sentiment score deviates from the sentiment baseline by more than a threshold amount of deviation; and
providing a computing device associated with the entity with access to the second database.

11. The computer-implemented method of claim 9, further comprising causing a cloud-based monitoring service to:
identify an access event in which a computing device accessed the second database; and
store a record indicating a user account associated with the access event.

12. The computer-implemented method of claim 5, further comprising:
determining that the sentiment score deviates from the sentiment baseline by more than a threshold amount of deviation; and
providing an alert to a computing device associated with the entity associated with the user, the alert indicating that the sentiment score associated with the user deviates from the sentiment baseline by more than the threshold amount of deviation.

13. The computer-implemented method of claim 5, further comprising:
determining a deviation value indicating a measure of the sentiment score deviating from the sentiment baseline;
ranking the user in a listing of other users associated with the entity based at least in part on the deviation value of the user; and
providing a computing device associated with the entity with access to the listing.

14. The computer-implemented method of claim 5, wherein the communication data comprises first communication data, further comprising:
receiving second communication data representing a plurality of electronic communications of the user;
causing the cloud-based sentiment-analysis service to determine a plurality of sentiment scores, individual sentiment scores in the plurality of sentiment scores corresponding to a respective electronic communication of the plurality of electronic communications; and
causing the cloud-based model service to build, at least partly using the plurality of sentiment scores, a machine-learning (ML) model that indicates the sentiment baseline for the user.

15. A system comprising:
one or more processors; and
one or more computer-readable media storing computer-executable instructions that, when executed, cause the one or more processors to:
determine that communication data representing an electronic communication of a user was stored in a data store that is at least partly managed by a cloud-based storage service;
cause a cloud-based sentiment-analysis service to:
analyze, at least partly using natural-language processing (NLP), the communication data; and
determine a sentiment score associated with the communication data, wherein the sentiment score indicates an attitude of the user with respect to an entity associated with the user;
cause a cloud-based model service to determine that the sentiment score deviates from a sentiment baseline by more than a threshold amount; and
send, to a computing device associated with at least one of the entity or a service provider, an indication that the sentiment score deviates from the sentiment baseline by more than the threshold amount,
wherein the cloud-based storage service, the cloud-based sentiment-analysis service, and the cloud-based model service are associated with the service provider.

16. The system of claim 15, the computer-executable instructions further cause the one or more processors to:
determine identity data indicating an identity of the user;
utilize a one-way cryptographic function on the identity data of the user to generate hashed identity data of the user; and
store, in a database provided at least partly by a cloud-based database service, an association between the hashed identity data and the sentiment score.

17. The system of claim 16, the computer-executable instructions further cause the one or more processors to:
identify an access event in which at least one of the computing device or another computing device accessed the database; and
store a record indicating a user account associated with the access event.

18. The system of claim 15, the computer-executable instructions further cause the one or more processors to:
determine a deviation value indicating a measure of the sentiment score deviating from the sentiment baseline;
rank the user in a listing of other users associated with the entity based at least in part on the deviation value of the user; and
provide at least one of the computing device or another computing device with access to the listing.

19. The system of claim 15, the computer-executable instructions further cause the one or more processors to:

determine that the sentiment score deviates from the sentiment baseline by more than a threshold amount of deviation; and provide an alert to at least one of the computing device or another computing device, the alert indicating that the sentiment score associated with the user deviates from the sentiment baseline by more than the threshold amount of deviation.

20. The system of claim 15, the computer-executable instructions further cause the one or more processors to:

receive, at least partly using a cloud-based electronic communication service, the communication data representing the electronic communication in real-time or near-real-time as the user communicates the electronic communication.

* * * * *